United States Patent [19]
Husch et al.

[11] 3,715,536
[45] Feb. 6, 1973

[54] SWITCH WITHIN A MOTOR VEHICLE DOOR LOCK MECHANISM

[75] Inventors: Albert Husch, Pulheim; Franz Kemenes, Cologne; Ludwig Pregel, Dansweiter, all of Germany

[73] Assignee: Ford Motor Company

[22] Filed: Sept. 13, 1971

[21] Appl. No.: 179,892

[52] U.S. Cl. ......... 200/61.64, 200/61.41, 200/61.44, 200/166 BE, 200/16 C
[51] Int. Cl. ................................................. H01h 3/16
[58] Field of Search .... 200/16 A, 16 C, 61.42–61.44, 200/61.7, 61.82, 159 R, 159 B, 166 BE, 166 BF, 61.62, 61.41, 61.55, 61.64

[56] References Cited

UNITED STATES PATENTS

| | | | |
|---|---|---|---|
| 2,257,706 | 9/1941 | Sladky | 200/61.55 |
| 2,816,972 | 12/1957 | Haut | 200/61.62 |
| 2,899,511 | 8/1959 | Fraser | 200/16 A X |
| 2,993,098 | 7/1961 | Canaday | 200/16 C |
| 3,180,950 | 4/1965 | Jacobsen | 200/61.41 |
| 3,301,974 | 1/1967 | Hancock | 200/61.42 X |
| 3,630,000 | 12/1971 | Mullings | 200/16 A X |

Primary Examiner—J. R. Scott
Attorney—Keith L. Kerschling et al.

[57] ABSTRACT

A switch device in a motor vehicle door latch mechanism. The latch mechanism includes a resilient wedge yieldable in a direction transversely of the door closing movement. A switch contact component is housed within a chamber in the wedge. In unlatched condition of the latch mechanism, the switch contact component closes an electrical circuit from a ground lead in the wedge to the latch mechanism metal support plate. The circuit may be used to control a warning light, passenger compartment interior lights or a warning buzzer.

Upon the latch mechanism being placed in latched condition when the door is closed, the switch contact component is moved out of contact with the ground lead in response to yielding movement of the wedge as the latter is engaged by a latch bolt or the like.

11 Claims, 7 Drawing Figures

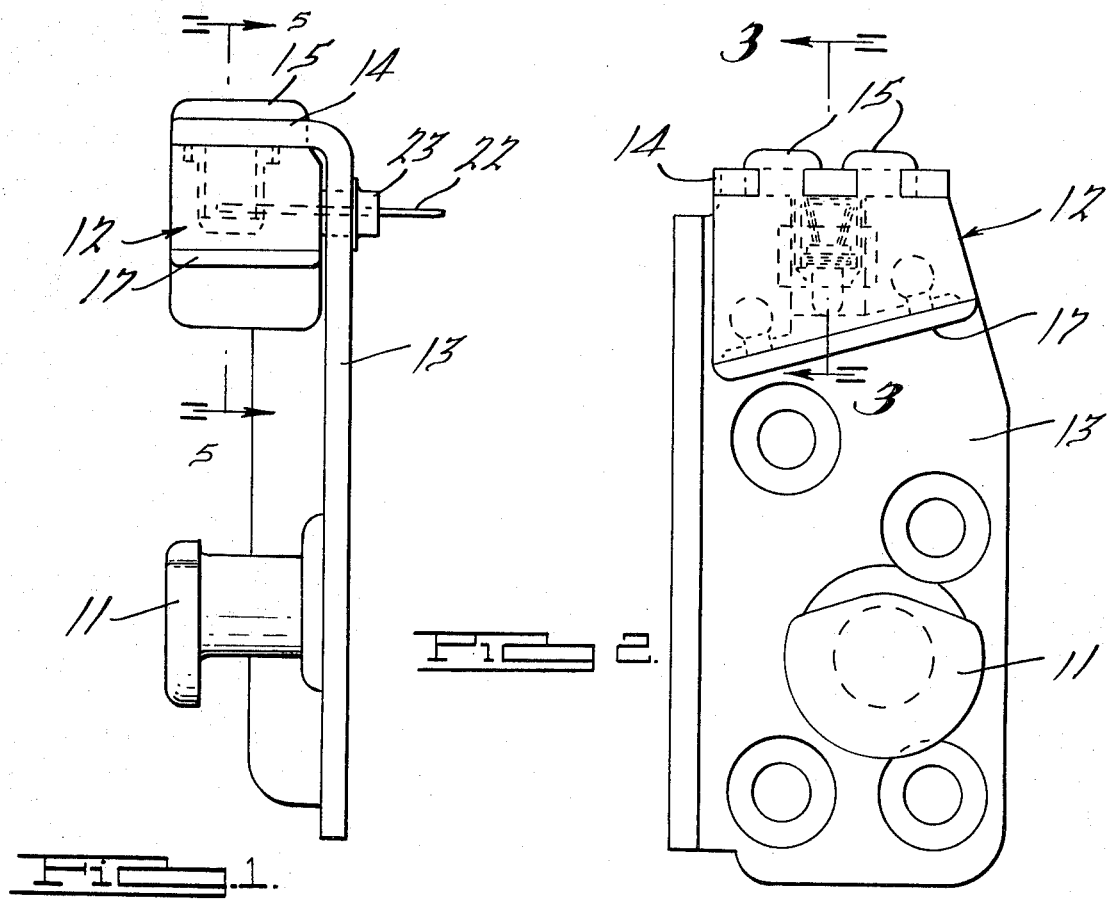
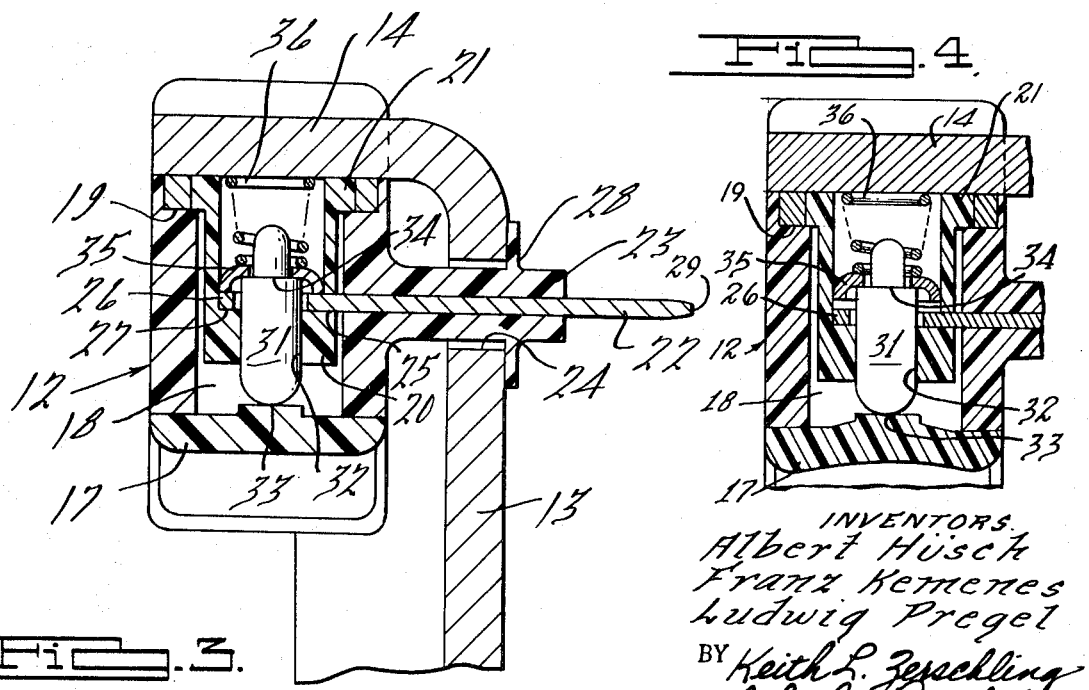

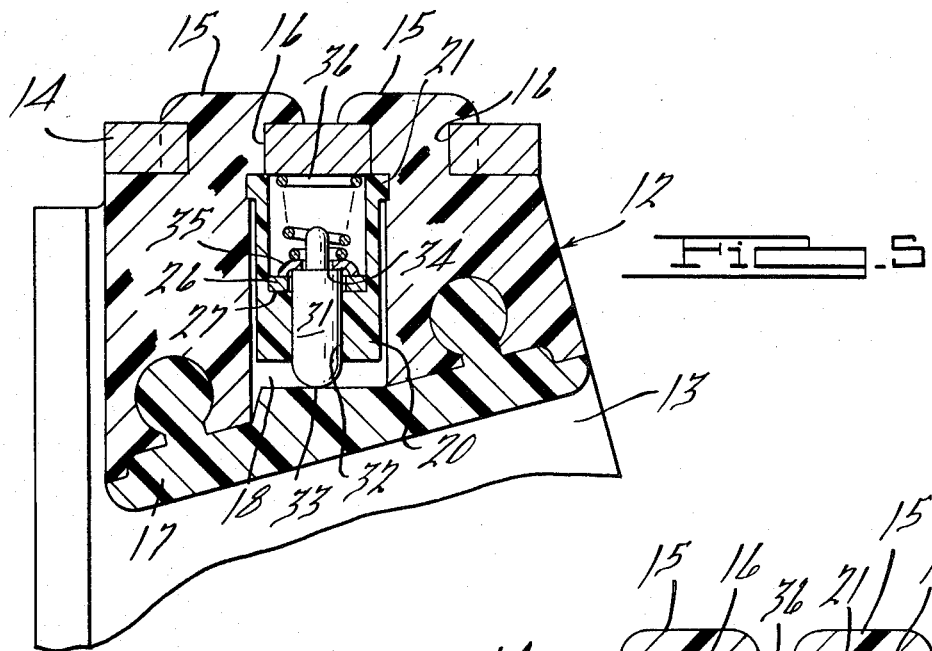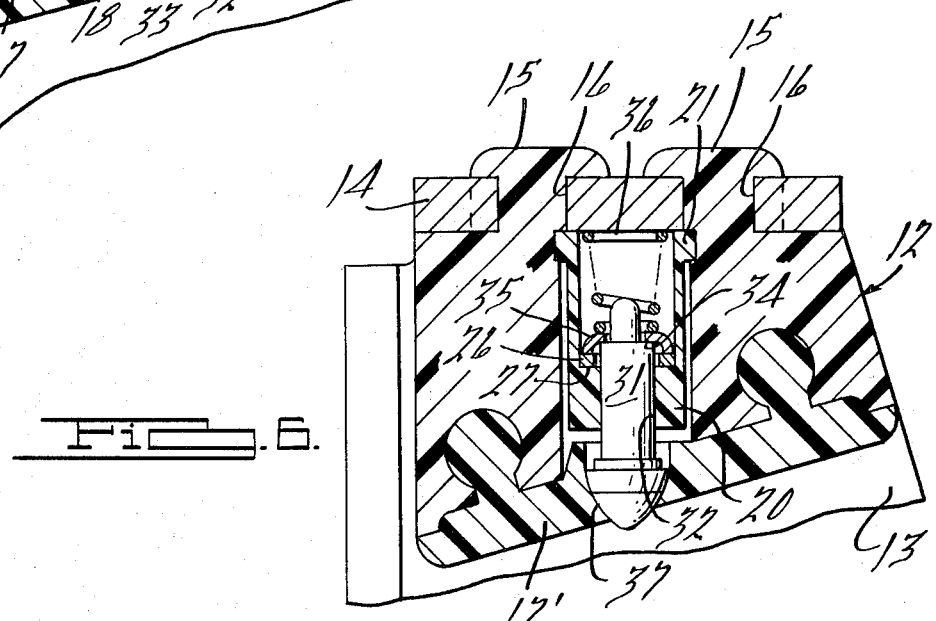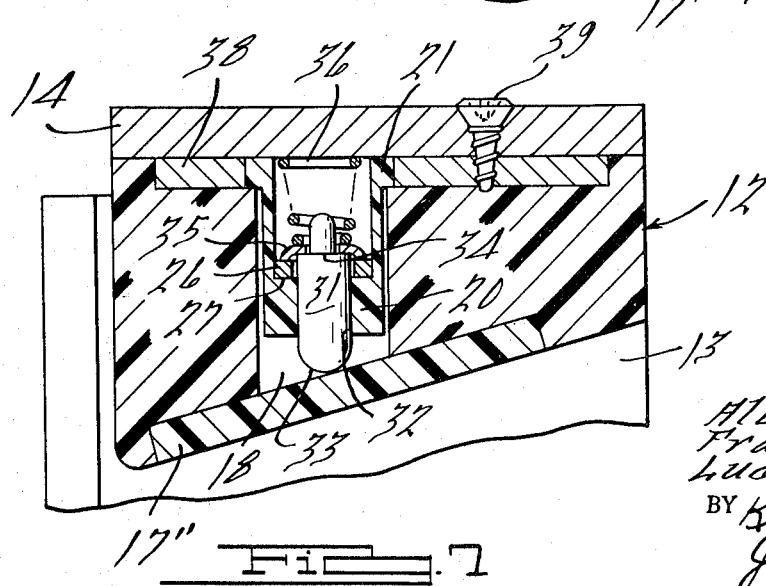

SWITCH WITHIN A MOTOR VEHICLE DOOR LOCK MECHANISM

BACKGROUND OF THE INVENTION

From U.S. Pat. No. 3,259,798 issued to B. Sandor on July 5, 1966, a switch device associated with a motor vehicle door latch mechanism is already know. In this known switch device, a lock wedge moveable in the direction of closing of the door carries a contact sleeve therethrough. The contact sleeve is arranged with one of its ends connected to a ground lead by way of a compression spring and the other of its ends adapted to bear against a contact point on a support plate of the latch mechanism.

It is also already known in this context to so design the switch device that the internal or passenger compartment lighting, for example, is switched on when the latch mechanism is in the prelocked or unlatched position. By this construction and arrangement of the switch device, the driver of a motor vehicle is given an indication when one of the doors is not completely closed.

This known switch device has a series of drawbacks which, in its application to modern motor vehicles, militate against safe and reliable operation.

It is conventional nowadays, in modern motor vehicles, to combine the door seal with the edge protector or windlace which surrounds the door opening so that a considerable economy in terms of material and assembly costs are achieved. With this disposition of the door seal, however, the doorlatch mechanism is displaced into a zone in which it is exposed to the ingress of water and dirt. The known switch device, if installed in this kind of position, would be exposed to severe corrosion and fouling at its many unprotected contact locations, such as between the ground lead and the metal compressor spring, the metal compressor spring and the contact sleeve, and the contact sleeve and the contact on the latch support plate. These factors militate against reliable operation.

The object of the present invention is to improve on a switch device of the kind above-described so that it can be employed in motor vehicles without experiencing the above drawbacks.

SUMMARY OF THE INVENTION

In accordance with the invention, its object is achieved in that the latch mechanism wedge is substantially immovable in the door closing direction, this being a known kind of artifice. The wedge is made of an elastic material. The switch contact component which is grounded across the latch mechanism support plate is journalled in an opening or chamber in the latch mechanism wedge, the opening being disposed perpendicularly to the door closing direction and being closed off by a horizontal flange on the latch mechanism support plate. The switch contact component, in the prelocked or unlatched position of the latch mechanism, bears against a ground conductor or lead projecting into the latch mechanism wedge, and in the final lock or latch position is lifted by a plunger which transmits the resilient deflecting movement of the wedge in the direction perpendicular to the door closing direction.

The opening or chamber in the wedge preferably contains a synthetic material bushing in the guide bore of which a metal or synthetic material plunger is displaceably assembled.

A ground conductor connected to the interior lighting system, can be inserted, prior to the assembly of the plunger, through a sealed lead-through in the wedge and a radial slot in the bushing, transversely of the plunger axis, and secured to the annular shoulder thereon.

The switch component is of annular form and is electrically connected through a metal variable-rate spring to the horizontal flange of the grounded support plate of the latch mechanism, and is supported against the shoulder on the plunger.

The plunger can bear at its bottom radiussed end against a slider plate which is made of wear-resistant synthetic material, and in the usual manner, is "buttoned" into the material of the lock wedge or moulded in situ therein.

The plunger can also be provided with a tapered bottom end and the slider plate of wear-resistant synthetic material can project into a tapered ball. Its bottom tip in this case stands a certain distance below the slider plate.

Equally, the plunger can have its bottom radiussed end in contact with a slider plate which is made of metal in the normal way and which is vulcanized into the elastic material of the lock wedge.

DESCRIPTION OF THE DRAWINGS

Further features and advantages of the present invention will be made more apparent as this description proceeds, reference being had to the accompanying drawings, wherein:

FIG. 1 is a side elevation of a door latch mechanism with a switch device in accordance with the present invention;

FIG. 2 is a frontal view of the latch mechanism of FIG. 1;

FIG. 3 is a section on the line 3-3 of FIG. 2;

FIG. 4 is a section view in part similar to FIG. 3 illustrating the mechanism in a second operative condition;

FIG. 5 is a section on the line 5-5 of FIG. 1;

FIG. 6 is a section view in part similar to FIG. 5 illustrating a second embodiment of the invention;

FIG. 7 also is a view in part similar to FIG. 5 illustrating a third embodiment of the invention.

DETAILED DESCRIPTION OF THE INVENTION

Referring now to the drawings, in FIGS. 1 and 2, a striker or keeper 11 and a locking wedge 12 mounted on a latch mechanism support plate 13 are illustrated.

The locking wedge 12 is substantially immovable in the direction of closing movement of a vehicle door (not shown), being secured to a horizontal flange 14 of the support plate 13 and consisting of a hard elastomeric or resilient material.

In the preferred embodiment of FIGS. 1 to 5, inclusive, the wedge 12 can be interlocked horizontally with the flange 14, in a conventional manner, through the medium of lugs 15 moulded in its top surface and engaged in slots 16 in the flange. The wedge is provided on its bottom surface with a "buttoned on" or in situ moulded slider plate 17.

The locking wedge is provided with a chamber 18 having a counterbore or step 19 which extends from the top attachment surface of the wedge downwardly and perpendicularly to the direction of closing of the door.

A synthetic material bushing 20 is assembled in the opening or chamber 18. The bushing 20 is supported through a flange 21 against the bottom of the counterbore 19 in the chamber 18, but is flush against the underside of the horizontal flange 14.

A ground lead 22 is assembled to the wedge 12 and bushing 20. The lead 22 extends through a sealing appendage 23 extending horizontally from the wedge body through an aperture 24 in the support plate. The lead 22 extends into bushing 20 through a radial slot 25 in the wall of the latter. The lead 22 has a ring-shaped end 26 that is secured or locked to the annular shoulder 27 of the bushing 20. The ground-lead appendage 23 is of such length that it insulates the ground lead 22 both where it penetrates the support plate 13 and also where it is adapted to pass through a door jamb metal stamping. The appendage 23 may be provided with a sealing flange 28 in order to seal an opening in the door frame. The free end 29 of the groundlead 22 is designed as the tongue part of a flat pin connector, and can be connected directly through a mating socket with an appropriate lead to the interior lighting.

A plunger 31 of synthetic material or metal is assembled in a guide bore 32 in the bushing 20, the plunger having a radiussed bottom end 33 and a shoulder 34.

On the plunger 31, an annular switch component 35 and a variable-rate spring 36 are then assembled. The variable-rate spring 36 establishes the electrical connection between the grounded support plate 13 and the contact component 35 resting against the shoulder 34 on the plunger 31.

From the foregoing, it is obvious that if a locking wedge 11 having a switch device in accordance with the present invention assembled therein, is inserted horizontally into engagement with the flange 14 of the support plate 13, then the contact space of the switch device is completely sealed against the ingress of water and dirt.

With the vehicle door opened and the locking wedge 12 disengaged from the door latch mechanism latching device (not shown), the plunger 31 seats at the bottom end against the internal stepped side of the slider plate 17. The shoulder 34 of the plunger 31 is so disposed in this context that the contact component 35 bears against the ground lead end 26 under the action of the variable-rate spring 36 and is lifted away from the shoulder 34 of the plunger 31 by a desired degree of lost motion. This ensures that when the door is closed, the shoulder 34 on the plunger 31 only lifts the contact component 35 after the lock wedge 12 has been deflected upwardly a predetermined distance after being engaged by the door latch mechanism latch bolt (see Fig. 4). In this fashion, switch malfunctions due to the tolerances in the proximate cooperating components can be largely avoided.

In FIGS. 6 and 7, two further embodiments of a switch device in accordance with the invention are shown. In each, the fundamental construction corresponds precisely to that of the embodiment shown in FIGS. 1 to 5. Therefore, similar components have been given similar references and modified components have been provided with one or two indices.

In FIG. 6, a slider plate 11' of wear-resistant synthetic material is provided with a taper bore 37 through which the plunger 31, with its tapered bottom end 33', projects a certain distance outside and can come into contact with the latch bolt which cooperates with the locking wedge 12.

In FIG. 7, instead of a slider plate 17 of synthetic material, a slider plate 11'' of metal is provided which is connected with the elastic material of the lock wedge 12'' by vulcanizing. The locking wedge 12'' is here attached in a conventional way through a vulcanized on-top metal plate 38 and two screws 39, to the flange 14'' of the lockplate 13''.

The invention disclosed will have many modifications which will be apparent to those skilled in the art in view of the teachings of this specification. It is intended that all modifications which fall within the true spirit and scope of this invention be included within the scope of the appended claims.

We claim:

1. A switch device incorporated in a motor vehicle door latch mechanism,
    the latch mechanism comprising a latch plate having a horizontal flange,
    and a locking wedge supported on the latch plate beneath the flange,
    the locking wedge being substantially immovable in door closing movement direction and yieldable in a direction transversely of door closing movement direction upon being engaged by a latching element as the latter moves into latched condition of the latch mechanism,
    characterized in that the locking wedge is made of resilient material and has a chamber therein disposed perpendicularly to the door closing movement direction and underlying the support plate horizontal flange,
    a ground lead extending through the wedge and having one end projecting into the chamber,
    a switch contact component housed in the chamber and positioned in juxtaposition to the ground lead one end,
    the contact component being adapted to ground the ground lead to the support plate of the latch mechanism when the latch is in unlatched condition,
    and plunger means coupled to the switch component responsive to yieldable movement of the wedge in the direction transversely of the door closing movement,
    the plunger means upon movement toward the horizontal flange of the latch plate causing disengagement of the switch component from the ground lead upon the latch mechanism becoming latched.

2. A switch device as claimed in claim 1, characterized in that:
    a bushing of synthetic material is positioned in the wedge chamber,
    the bushing having a guide bore slidably receiving the plunger means.

3. A switch device as claimed in claim 2, characterized in that:
    the ground lead is sealed in a lateral extension of the wedge, and the switch contact component contacting end of the ground lead projects through a radial slot in the side wall of the bushing and is secured to an annular shoulder at the base of the guide bore of the bushing.

4. A switch device as claimed in claim 3, characterized in that:

the switch contact component is of annular shape, a metal variable-rate spring extends between the horizontal flange of the latch plate and the switch contact component to make an electrical connection therebetween, and the switch contact component rests on a shoulder of the plunger means.

5. A switch device as claimed in claim 4, characterized in that:

the plunger means has a radiussed bottom end, and the wedge has a slider plate having a stepped side and being made of a wear resistant synthetic material, the plunger means end bearing against the stepped side of the slider plate.

6. A switch device as claimed in claim 5, characterized in that:

the slider plate is made of metal and is vulcanized to the resilient material of the wedge.

7. A switch device as claimed in claim 1, characterized in that:

the switch contact component is of annular shape, a metal variable-rate spring extends between the horizontal flange of the latch plate and the switch contact component to make an electrical connection therebetween, and the switch contact component rests on a shoulder of the plunger means.

8. A switch device as claimed in claim 7, characterized in that:

the plunger means has a radiussed bottom end, and the wedge has a slider plate having a stepped side and being made of wear-resistant synthetic material, the plunger means end bearing against the stepped side of the slider plate.

9. A switch device as claimed in claim 8, characterized in that:

the slider plate is made of metal and is vulcanized into the resilient material of the wedge.

10. A switch device as claimed in claim 1, characterized in that:

the plunger means has a radiussed bottom end, and the wedge has a slider plate having a stepped side and being made of wear-resistant synthetic material, the plunger means end bearing against the stepped side of the slider plate.

11. A switch device as claimed in claim 10, characterized in that:

the slider plate is made of metal and is vulcanized into the resilient material of the wedge.

* * * * *